United States Patent
Ott et al.

(10) Patent No.: US 11,408,480 B2
(45) Date of Patent: Aug. 9, 2022

(54) ADAPTIVE TUNED VIBRATION ABSORBER

(71) Applicant: ITT Manufacturing Enterprises LLC, Wilmington, DE (US)

(72) Inventors: Mark Ott, Orchard Park, NY (US); Brian Fischer, Pasadena, CA (US); Robert D. Matusek, Brecksville, OH (US); Marshall W. Downing, Erie, PA (US); Daniel P. Kowalik, Orchard Park, NY (US); Robert Misevski, Orchard Park, NY (US); David Charles DiGello, Erie, PA (US); Eric J. Peiffer, Jr., West Seneca, NY (US)

(73) Assignee: ITT Manufacturing Enterprises LLC, Wilmington, DE (US)

( * ) Notice: Subject to any disclaimer, the term of this patent is extended or adjusted under 35 U.S.C. 154(b) by 0 days.

(21) Appl. No.: 16/213,521

(22) Filed: Dec. 7, 2018

(65) Prior Publication Data

US 2020/0182323 A1 Jun. 11, 2020

(51) Int. Cl.
*F16F 7/10* (2006.01)
*F16F 15/02* (2006.01)
(Continued)

(52) U.S. Cl.
CPC ............ *F16F 7/1005* (2013.01); *F16F 7/104* (2013.01); *F16F 15/002* (2013.01); *F16F 15/02* (2013.01);
(Continued)

(58) Field of Classification Search
CPC ........ F16F 7/1005; F16F 7/1011; F16F 7/104; F16F 7/116; F16F 15/02; F16F 15/002; F16F 15/03; F16F 15/04; F16F 15/067
(Continued)

(56) References Cited

U.S. PATENT DOCUMENTS 989,958 A  4/1911 Frahm
2,451,541 A * 10/1948 Doman ................. B64C 27/008
                                                      416/145
(Continued)

FOREIGN PATENT DOCUMENTS

CN  103629299 A   3/2014
DE    4413447 A1  11/1994
(Continued)

OTHER PUBLICATIONS

Dialog translation, JP 63 243544 A, Kondo et al., Oct. 11, 1988. (Year: 1988).*
(Continued)

*Primary Examiner* — Thomas J Williams
(74) *Attorney, Agent, or Firm* — Scully, Scott, Murphy & Presser, P.C.

(57) ABSTRACT

A system may detect a vibration being applied to a tuned vibration absorber. The tuned vibration absorber may include a beam, a mass, springs, a sensor, and an actuator. The mass may be disposed on the beam at a current position. The actuator may be configured to adjust a position of the mass on the beam. The system may identify a target position of the mass on the beam based on the detected vibration. The system may generate a drive signal, based on the target position, to control the actuator to adjust the position of the mass on the beam. The system may control the actuator to adjust the position of the mass from the current position on the beam to the target position on the beam to attenuate the vibration.

20 Claims, 7 Drawing Sheets

(51) Int. Cl.
*F16F 7/104* (2006.01)
*F16F 15/067* (2006.01)
*F16F 15/00* (2006.01)

(52) U.S. Cl.
CPC ......... *F16F 15/067* (2013.01); *F16F 2222/08* (2013.01); *F16F 2224/0208* (2013.01); *F16F 2228/066* (2013.01); *F16F 2230/0023* (2013.01); *F16F 2230/18* (2013.01)

(58) Field of Classification Search
USPC .................................................. 188/378–380
See application file for complete search history.

(56) References Cited

U.S. PATENT DOCUMENTS

| | | | | |
|---|---|---|---|---|
| 4,935,651 | A * | 6/1990 | Hong | F16F 7/10 188/380 |
| 5,456,341 | A | 10/1995 | Garnjost et al. | |
| 5,520,375 | A * | 5/1996 | Leibach | F16F 7/1011 188/378 |
| 5,814,963 | A * | 9/1998 | Girard | F16F 7/1005 318/460 |
| 6,045,090 | A * | 4/2000 | Krysinsky | B64C 27/001 188/378 |
| 6,871,565 | B2 * | 3/2005 | Allaei | F16F 7/10 188/378 |
| 6,954,686 | B2 | 10/2005 | Aubourg et al. | |
| 6,983,833 | B2 | 1/2006 | Ivers et al. | |
| 6,992,450 | B2 * | 1/2006 | Nakajima | F16F 7/1005 248/636 |
| 8,044,629 | B2 | 10/2011 | Fallahi | |
| 9,296,476 | B2 * | 3/2016 | Seifert | B64C 27/001 |
| 9,644,698 | B2 * | 5/2017 | Bueter | F16F 7/1005 |
| 2004/0164253 | A1 | 8/2004 | Ito | |
| 2008/0243344 | A1 * | 10/2008 | Casey | E02F 9/262 701/50 |
| 2010/0057260 | A1 * | 3/2010 | Fallahi | F16F 7/1005 700/280 |
| 2013/0282204 | A1 | 10/2013 | Seifert et al. | |
| 2018/0265187 | A1 * | 9/2018 | Jouve | F16F 7/116 |

FOREIGN PATENT DOCUMENTS

| | | | |
|---|---|---|---|
| DE | 102005060779 A1 | 6/2007 | |
| JP | 63096336 A * | 4/1988 | ............ F16F 7/104 |
| JP | 63243544 A * | 10/1988 | ............ F16F 7/1005 |
| JP | 8247214 A | 9/1996 | |
| JP | 2002286088 A | 10/2002 | |
| JP | 201213126 A | 1/2012 | |
| KR | 1020060070745 A | 6/2006 | |

OTHER PUBLICATIONS

Dialog translation, JP 63-096336 A. (Year: 1988).*
Gustavsson, M., "A self-adaptive resonant device and its use for noise control in turbo-prop aircraft", Inter-Noise 2016, Aug. 21-24, 2016, pp. 3319-3325.
International Search Report with the Written Opinion dated Apr. 6, 2020 received in International application No. PCT/US2019/064820.
Office Action dated May 26, 2022 received in CN Patent Application Serial No. 201980088313.8, 23 pages.

* cited by examiner

ADAPTIVE TUNED VIBRATION ABSORBER

BACKGROUND

Unless otherwise indicated herein, the materials described in this section are not prior art to the claims in this application and are not admitted to be prior art by inclusion in this section.

A tuned vibration absorber (TVA) may attenuate vibration levels experienced by, for example, a rotorcraft, at a specific frequency. The motion of the TVA may counteract a vibration input by applying forces out of phase with the vibration input. The counteraction performed by the TVAs may reduce the vibration levels experienced by the rotorcraft.

SUMMARY

In some examples, a method for attenuating vibration being applied to a tuned vibration absorber may be generally described. The method may include detecting a vibration of a structure. The method may further include identifying a target position of the mass on the beam based on the detected vibration. The method may further include generating a drive signal based on the identified target position. The drive signal may be effective to control an actuator to adjust the position of the mass on the beam. The method may further include controlling the actuator, based on the drive signal, to adjust the position of the mass from a current position on the beam to the target position on the beam to attenuate the vibration.

In some examples, a tuned vibration absorber is generally described. The tuned vibration absorber may include a beam, where a fixed end of the beam may be attached to a fixed end of the tuned vibration absorber, such that the beam may oscillate about the fixed point. The tuned vibration absorber may further include a mass disposed on the beam. The tuned vibration absorber may further include an actuator configured to adjust a position of the mass on the beam. The tuned vibration absorber may further include a motor controller configured to control the actuator. The tuned vibration absorber may further include a sensor configured to detect a vibration of a structure. The sensor may be further configured to generate sensor data associated with the vibration. The sensor may be further configured to send the sensor data to a processor. The motor controller may be configured to receive control data from the processor. The control data may be based on the sensor data, and the control data may indicate a target position of the mass on the beam. The motor controller may be further configured to generate a drive signal based on the received control data. The motor controller may be further configured to control the actuator, based on the drive signal, to adjust the position of the mass from a current position on the beam to the target position on the beam. The mass being located at the target position on the beam may be effective to attenuate the vibration.

In some examples, a system effective to attenuate vibrations is generally described. The tuned vibration absorber may include a beam, where a fixed end of the beam may be attached to a fixed point of the tuned vibration absorber, such that the beam may oscillate about the fixed point. The tuned vibration absorber may further include a mass disposed on the beam. The tuned vibration absorber may further include an actuator configured to adjust a position of the mass on the beam. The tuned vibration absorber may further include a motor controller configured to control the actuator. The tuned vibration absorber may further include a sensor configured to detect a vibration of a structure. The system may further include a memory and a processor, where the processor may be configured to be in communication with the tuned vibration absorber and the memory. The sensor may be further configured to generate sensor data associated with the vibration. The sensor may be further configured to send the sensor data to the processor. The processor may be configured to identify a target position of the mass on the beam based on the sensor data. The processor may be further configured to generate control data that indicates the identified target position. The processor may be further configured to send the control data to the motor controller. The motor controller may be configured to receive the control data from the processor. The motor controller may be further configured to generate a drive signal based on the received control data. The motor controller may be further configured to control the actuator, based on the drive signal, to adjust the position of the mass from a current position on the beam to the target position on the beam. The mass being located at the target position on the beam may be effective to attenuate the vibration.

The foregoing summary is illustrative only and is not intended to be in any way limiting. In addition to the illustrative aspects, embodiments, and features described above, further aspects, embodiments, and features will become apparent by reference to the drawings and the following detailed description. In the drawings, like reference numbers indicate identical or functionally similar elements.

DETAILED DESCRIPTION

In the following description, numerous specific details are set forth, such as particular structures, components, materials, dimensions, processing steps and techniques, in order to provide an understanding of the various embodiments of the present application. However, it will be appreciated by one of ordinary skill in the art that the various embodiments of the present application may be practiced without these specific details. In other instances, well-known structures or processing steps have not been described in detail in order to avoid obscuring the present application.

To be described in more detail below, a tuned vibration absorber 101 (shown in FIG. 1) in accordance with the present disclosure may eliminate a need for more than one sensor being integrated into a tuned vibration absorber, which may lead to a reduction in cost and complexity, and also may alleviate a concern of fatigue on the sensor and associated wires where the relative displacements of the beam may be significant. The adaptive tuned vibration absorber may include a sensor to facilitate adaptation of the system for optimal performance at any number of frequencies. By using one sensor and moving a mass on a beam to an optimal position, the frequency response may be altered accordingly to attenuate incoming vibration levels. Further, the TVA in accordance with the present disclosure may provide an adaptive approach to attenuate different incoming vibration levels without a need to perform an exact tuning of the TVA (e.g., a fixed frequency passive TVA).

Figure 1:
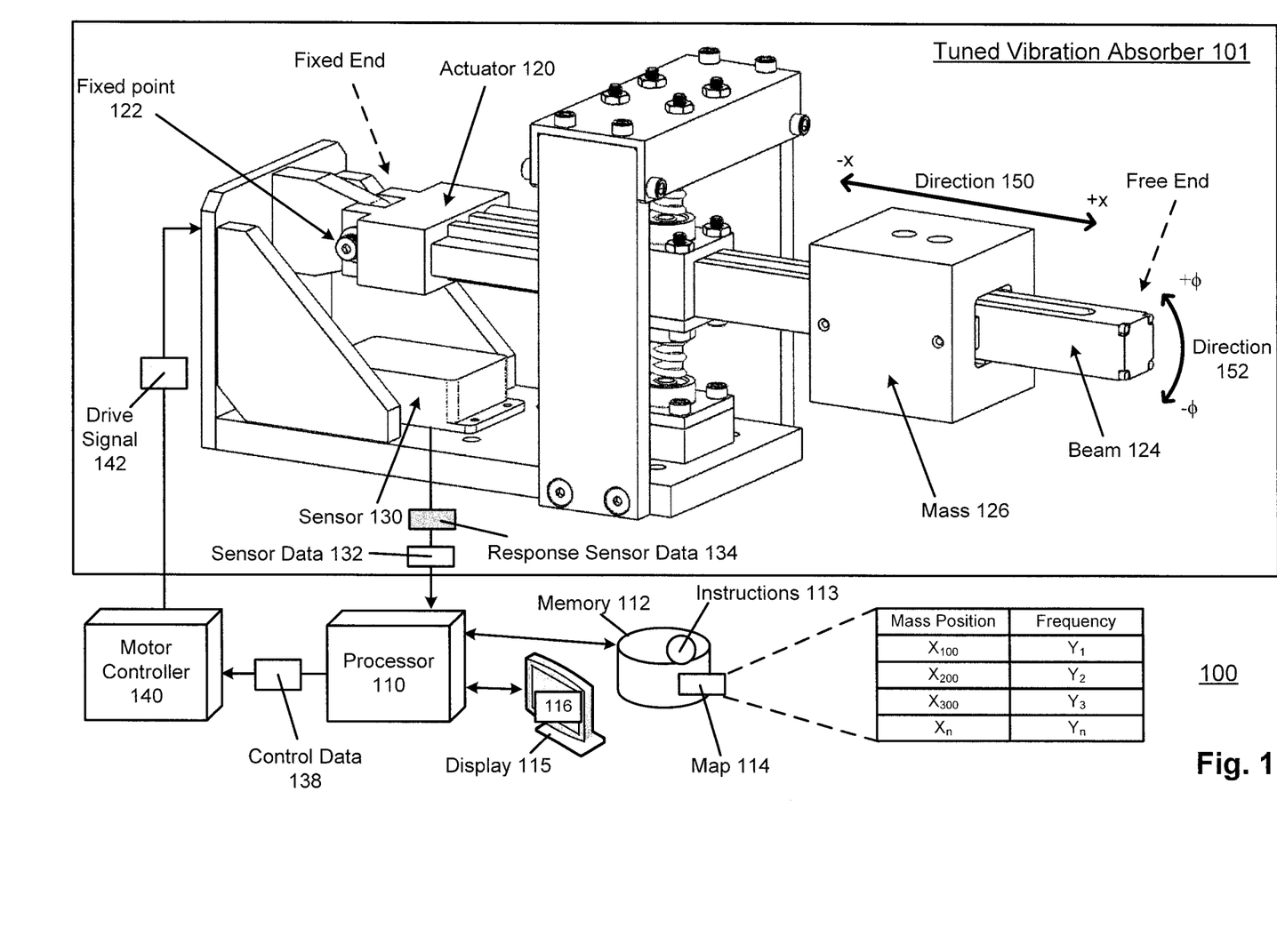
FIG. 1 illustrates an example system that may implement an adaptive tuned vibration absorber, in one embodiment.

FIG. 1 illustrates an example system that may implement an adaptive tuned vibration absorber, arranged in accordance with at least some embodiments presented herein. System 100 may include a tuned vibration absorber 101, a processor 110, a memory 112, and/or a motor controller 140, configured to be in communication with each other. In some examples, motor controller 140 may be a part of tuned vibration absorber 101. Tuned vibration absorber 101 may include an actuator 120, a sensor 130, a beam 124, and a mass 126. Actuator 120 may be a linear actuator (detailed operations of actuator 120 will be described below), and may be configured to adjust a position of mass 126 along a direction 150 on beam 124. Direction 150 may be parallel to a longitudinal direction of beam 124. In some examples, tuned vibration absorber 101 may be disposed in machines such as rotorcrafts, fixed wing aircrafts, automobiles, engines, wind turbines, pumps, etc. In some examples, mass 126 may be made of materials with relatively high density, such as tungsten. A size of mass 126 may be based on a desired implementation of system 100, such as a location of the tuned vibration absorber 101. In an example, tuned vibration absorber 101 may be disposed in a particular location of a machine. For example, tuned vibration absorber 101 may be disposed underneath, or in proximity, to a seat of a pilot of a rotorcraft.

In some examples, processor 110 and memory 112 may be components of a computer device of the machine that houses tuned vibration absorber 101, such as a computer of a rotorcraft. Processor 110 may be configured to execute instructions 113 stored in memory 112 to perform the methods described in the present disclosure. For example, instructions 113 may include instructions, such as executable code, related to frequency analysis and feedback control systems, etc., that may be executed by processor 110 to implement system 100. In some examples, instructions 113 may be part of a standalone application that may be installed on the computer device including processor 110 and memory 112.

In an example, tuned vibration absorber 101, or a structure that houses tuned vibration absorber 101, may experience turbulence that causes vibrations. As tuned vibration absorber 101 vibrates, beam 124 may oscillate or rotate about a fixed point 122 in a rotational direction 152, where direction 152 may be a circumferential direction with respect to fixed point 122. In some examples, fixed point 122 may be a part, or a structure, of tuned vibration absorber 101 that connects beam 124 to tuned vibration absorber 101. In an example, fixed point 122 may be a bearing that fastens beam 124 to tuned vibration absorber 101, where the bearing may act as a pivot such that beam 124 may rotate or oscillate about the bearing. In another example, beam 124 may be a cantilever beam with a fixed end of beam 124 attached to tuned vibration absorber 101 at fixed point 122, such that beam 124 oscillates about fixed point 122. Sensor 130 may be a vibration sensor, and may be configured to detect the vibration of tuned vibration absorber 101 and, in response, may generate sensor data 132 that may indicate a vibration pattern of the vibration. In some examples, sensor 130 may include an accelerometer such that sensor data 132 generated by sensor 130 may include a set of acceleration forces over time, where the acceleration forces are caused by the vibration. Upon generating sensor data 132, sensor 130 may send sensor data 132 to processor 110.

Memory 112 may be configured to store a map 114 that includes associations or mappings between each position of mass 126 on beam 124 and one or more frequencies of vibrations. The positions and vibration frequencies mapped in map 114 may include historical data. In an example of map 114 shown in FIG. 1, a mass position of $X_{100}$ may be a position of mass 126 on beam 124 mapped to a frequency $Y_1$, which may indicate that adjusting mass 126 to position $X_{100}$ on beam 124 may be optimal to counteract a vibration of frequency $Y_1$. The mapping of mass position $X_{100}$ to frequency $Y_1$ may be based on historical data indicating a vibration of frequency $Y_1$ was successfully attenuated (e.g., reducing an amplitude or a magnitude of the vibration being experienced by the tuned vibration absorber 101 to a value below a threshold) by adjusting mass 126 to position $X_{100}$ on beam 124, at one or more instances. In some examples, map 114 may include mappings between each position of mass 126 and one or more frequency ranges. Thus, if a detected vibration frequency is within a particular frequency range, a position mapped to the particular frequency range in map 114 may be deemed as a position of mass 126 that may attenuate the detected vibration frequency.

Processor 110 may receive sensor data 132 from sensor 130 and, in response, may determine one or more characteristics of the vibration indicated by sensor data 132. For example, processor 110 may determine an amplitude of the vibration over a range of times, acceleration forces of the vibration over a range of times, a duration of the vibration, durations of each stage of vibrations, a rate of change of the amplitudes, a frequency of the vibration, a velocity of the vibration, an acceleration of the vibration, etc. Processor 110 may store the determined characteristics in memory 112.

Based on the determined characteristics, processor 110 may identify a position of mass 126 from map 114 stored in memory 112. For example, if tuned vibration absorber 101 is vibrating at the vibration frequency $Y_1$, processor 110 may identify position $X_{100}$, which is mapped to frequency $Y_1$ in map 114, as a target position. Processor 110 may generate control data 138 based on the identified position $X_{100}$, where control data 138 may be an input to motor controller 140. Control data 138 may indicate an amount of actuation to be performed by actuator 120 to adjust mass 126 from a current position to the target position of position $X_{100}$. In some examples, a previous or current position of mass 126 may be stored in memory 112, such that processor 110 may generate control data 138 based on the stored current position of mass 126. For example, if mass 126 is located at a current position $X_{200}$ prior to the detection of vibration at frequency $Y_1$, processor 110 may generate control data 138 to indicate an amount of actuation required to move mass 126 from position $X_{200}$ to the target position $X_{100}$. Processor 110 may send control data 138 to motor controller 140. Motor controller 140 may convert control data 138 into a drive signal 142, where drive signal 142 may be an actuator command including a train of pulses, and may be effective to drive or control actuator 120 to adjust the position of mass 126 on beam 124. In examples where actuator 120 may be a linear actuator, drive signal 142 may be a signal effective to turn a screw (described below) of actuator 120 by a particular amount of rotation, and in a particular rotation direction, to adjust the position of mass 126 on beam 124 to position $X_{100}$.

In an example, a mapping between a detected frequency and a position of mass 126 on beam 124 may be absent from map 114. In response to the absence, tuned vibration absorber 101 may execute a search mode. The execution of the search mode may include moving mass 126 from a current position along one of the +x or −x directions, and during the move, continuously measuring vibration characteristics (e.g., amplitude or frequency) of tunes vibration absorber 101. Processor 110 may receive the measured vibration characteristics from sensor 130, and may continuously search for the measured characteristics in map 114 to identify a target position of mass 126 on beam 124. In an example, processor 110 may receive a current measured frequency from sensor 130 and may identify a presence of a mapping between a position and the current measured frequency in map 114. Processor 110 may generate control data 138 based on the identified mapping to indicate a target position is the position mapped to the current measured frequency. Motor controller 140 may generate drive signal 142 to drive mass 126 to the target position to attenuate the current measured frequency.

Tuned vibration absorber 101 may continuously detect vibrations and identify, or search for, a desired target position of mass 126 on beam 124 to attenuate or counteract vibrations of different amplitudes and/or frequency being experienced by tuned vibration absorber 101. As a result of the continuous detection of vibrations and adjustment of positions of mass 126 on beam 124, tuned vibration absorber 101 may be implemented as an adaptive tuned vibration absorber that adapts to changes in vibrations. The continuous detection also allows system 100 to learn different positions of mass 126 that may attenuate different frequencies. By learning different positions of mass 126 that may attenuate different frequencies, an efficiency of system 100 to attenuate vibrations may be continuously improved. For example, processor 110 may continuously populate map 114 with experimental data and operational data indicating successful attenuations and eliminating mappings of insufficient attenuation, such that processor 110 may quickly identify appropriate positions of mass 126 in response to detection of each vibration detection.

In some examples, processor 110 may generate map 114 based on results from one or more tests executed on tuned vibration absorber 101. For example, an upward sine sweep test with increasing frequencies may be executed on tuned vibration absorber 101, such as by exposing tuned vibration absorber 101 to different vibrations with a range of increasing frequencies. In another example, a downward sine sweep test with decreasing frequencies may be executed on tuned vibration absorber 101, such as by exposing tuned vibration absorber 101 to different vibrations with a range of decreasing frequencies. Accelerometers may be disposed on different locations of tuned vibration absorber 101, such as a first accelerometer may be disposed at a first location that may be in proximity to sensor 130, second accelerometer may be disposed at a second location that may be on a surface of mass 126 when mass 126 is at a particular location on beam 124, such as $X_{100}$. The first accelerometer may output first acceleration data indicating a response of tuned vibration absorber 101 to the vibrations input from the sine sweep test. The second accelerometer may output second acceleration data indicating a response of mass 126 to the vibrations input from the sine sweep test. Processor 110 may perform analysis on the first acceleration data and the second acceleration data. For example, processor 110 may identify a frequency corresponding to a lowest acceleration among the first acceleration data, where the identified frequency may be a frequency that may be optimally attenuated by adjusting mass 126 to position $X_{100}$. In an example, the lowest acceleration among the first acceleration data may indicate that when an input vibration has the identified frequency and mass 126 is positioned at $X_{100}$, tuned vibration absorber 101 experiences a smallest degree of vibration. Thus, processor 110 may map the identified frequency to position $X_{100}$ in map 114. Processor 110 may continue to identify a frequency for all possible positions of mass 126 on beam 124, and perform the mapping, in order to generate map 114.

In some examples, processor 110 may be further configured to output a user interface 116 on a display 115 configured to be in communication with processor 110. A user may view various data relating to system 100 on user interface 116, such as acceleration levels of the vibration, mass position on beam 124, recognized dominant frequency among the frequencies of the vibration being experienced by tuned vibration absorber 101, a percent isolation of isolated frequencies, etc. User interface 116 may further allow the user to enter user inputs, such as making a selection to deactivate system 100 in order to drive mass 126 back to a default position $X_{100}$. In some examples, user interface 116 may be displayed on a display of a rotorcraft where tuned vibration absorber 101 may be disposed, such that an operator of the rotorcraft may view data relating to system 100 and control activations and deactivations of tuned vibration absorber 101.

Figure 2A:
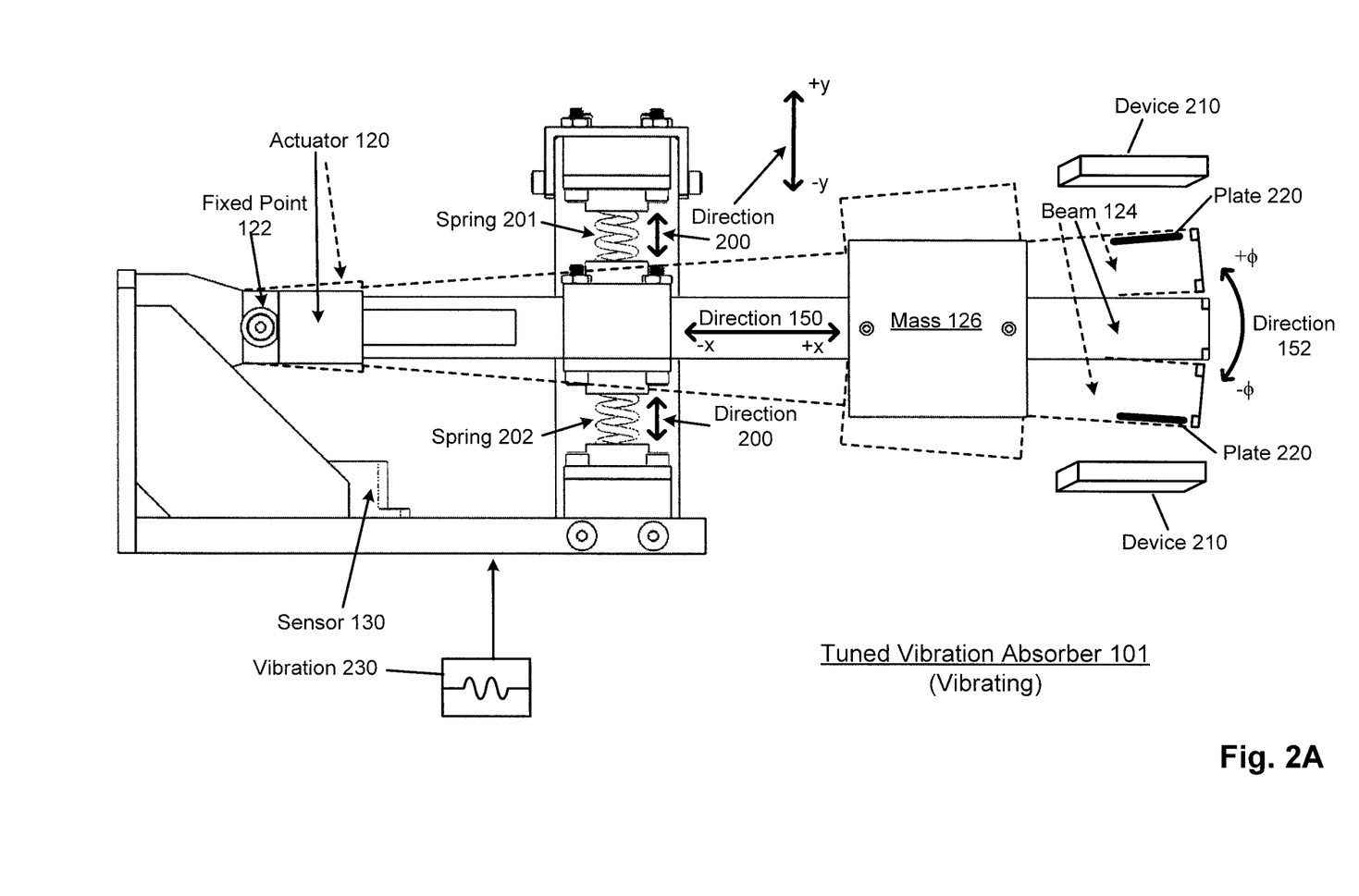
FIG. 2A illustrates a side view of an adaptive tuned vibration absorber, in one embodiment.

FIG. 2A illustrates a side view of an adaptive tuned vibration absorber, arranged in accordance with at least some embodiments presented herein. FIG. 2A may include components that are labeled identically to components of FIG. 1, which will not be described again for the purposes of clarity. The description of FIG. 2A may reference at least some of the components of FIG. 1.

In an example shown in FIG. 2, an input vibration 230 may be applied to tuned vibration absorber 101. As tuned vibration absorber 101 vibrates, beam 124 may oscillate and may rotate about fixed point 122 in direction 152. As beam 124 oscillates, one or more damping components of tuned vibration absorber 101 may restrict the oscillation of beam 124. For example, tuned vibration absorber 101 may include a spring 201 and a spring 202 that may each extend or compress based on the vibration of beam 124. The extension and compression of springs 201, 202, may be in a direction 200, where direction 200 is orthogonal to direction 150, and traverse to the longitudinal direction of beam 124. The extension and compression of springs 201, 202 may restrict the oscillation of beam 124, such that beam 124 may not rotate or oscillate outside of a threshold angle (e.g., oscillating out of range may damage surrounding components). In an example, the threshold angle may be denoted as φ, such that beam 124 may oscillate within a range of angles [−φ:φ] in direction 152. In some examples, a size and/or a weight of mass 126, may be further based on a stiffness of springs 201, 202. Thus, changes in the stiffness of springs 201, 202, while keeping a size of mass 126 fixed, may change the mappings between the positions of mass 126 on beam 124 and vibration frequencies (e.g., map 114 shown in FIG. 1).

As beam 124 oscillates due to vibration 230 being applied by tuned vibration absorber 101, a weight of mass 126 may provide forces in the +/−y direction (along direction 200) to attenuate vibration 230 applied to the tuned vibration absorber 101. As the oscillation of beam 124 is being excited, vibration 230 applied to tuned vibration absorber 101 may also be attenuated. Different positions of mass 126 along direction 150 on beam 124, along with the weight of mass 126 and stiffness of springs 201 and 202, may lead to different forces being created by beam 124 in rotational direction 152, such that the applied forces may counteract the oscillation of applied vibrations to the tuned vibration absorber 101.

In some examples, tuned vibration absorber 101 may include additional damping components such as passive damping devices 210 ("devices 210") to prevent beam 124 from rotating at angles outside of the threshold angle. Devices 210 may be disposed at locations that are outside of the rotation range of beam 124 (e.g., from −ϕ to ϕ). The locations of devices 210 may prevent devices 210 from contacting beam 124.

In an example, devices 210 may be permanent magnets, and one or more plates 220 may be disposed on beam 124, where plates 220 may each be made of conductive materials such as aluminum or copper. Due to the locations of devices 210 being outside of the rotation range of beam 124, if beam 124 rotates to the threshold angles −ϕ or ϕ, plates 220 may not contact the permanent magnets (devices 210). However, plates 220 may be within a inductive range with the permanent magnets (device 210), such that the magnetic fields of the permanent magnets may induce current on plates 220 to restrict further motion past the threshold angle ϕ (e.g. Len's Law), and thus preventing beam 124 from oscillating or rotating outside of the range of angles [−ϕ:ϕ] in direction 152.

In another example, devices 210 may be elastomers or spring bumpers disposed at locations outside of the rotation range of beam 124. When beam 124 oscillates out of the range of angles [−ϕ:ϕ], the elastomers or spring bumpers may restrict the motion of beam 124. In some examples, processor 110 may be further configured to control devices 210, such as activating or deactivating devices 210 based on different inputs. For example, when tuned vibration absorber 101 is disposed in an aircraft, processor 110 may activate device 210 to damp the motion of beam 124 during a startup period of the aircraft, and after a particular amount of time, stop the restriction of the motion of beam 124 to allow tuned vibration absorber 101 to operate under unrestricted conditions. In some examples, processor 110 may also activate device 210 to brake tuned vibration absorber 101 in order to completely prevent any motion of beam 124. As such, processor 110 may be configured to execute partial damping to control motions of beam 124, or execute complete damping to lock the motion of beam 124.

In some examples, in response to detecting particular situations, tuned vibration absorber 101 may drive mass 126 back to a home or default position, such as $X_{100}$, on beam 124. For example, sensor 130 may measure an amplitude of vibration 230 at a time interval, and may send the measured amplitudes to processor 110. Processor 110 may compare each received amplitude of vibration 230 with a range of threshold amplitudes that may be stored in memory 112. In response to detecting or determining that a measured amplitude is outside the range of threshold amplitudes, processor 110 may generate control data 138 to indicate an amount of movement from a current position of mass 126 back to the default position of $X_{100}$. Motor controller 140 may thus generate drive signal 142 to drive mass 126 from the current position back to the default position. In another example, sensor 130 may measure a frequency of vibration 230 at a time interval, and may send the measured frequencies to processor 110. Processor 110 may compare each received frequency of vibration 230 with a defined range of frequencies that may be predefined and stored in memory 112. In response to detecting or determining that a measured frequency is outside of the range of frequencies, processor 110 may generate control data 138 to indicate an amount of movement from a current position of mass 126 back to the default position of $X_{100}$.

Figure 2B:
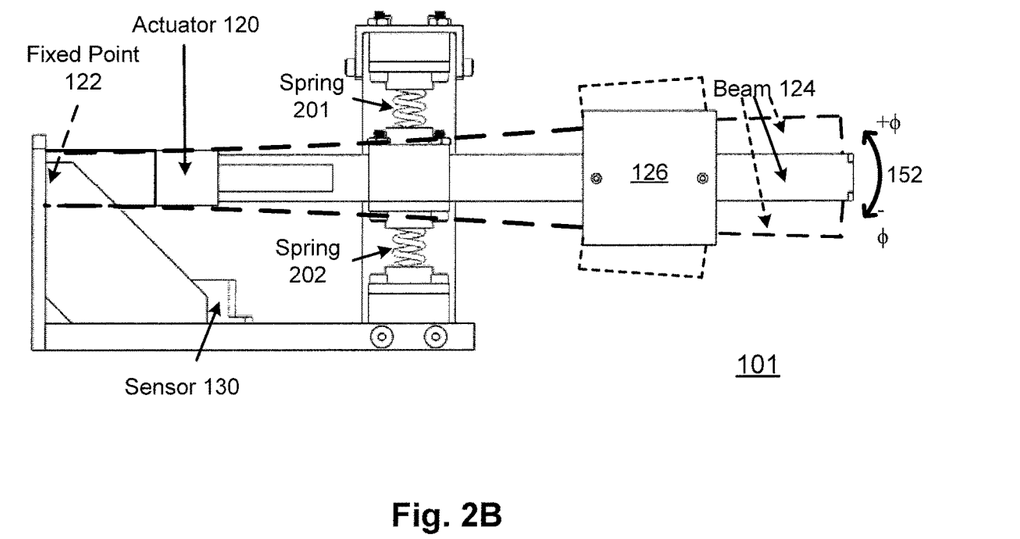
FIG. 2B illustrates a side view of an adaptive tuned vibration absorber, in one embodiment.
Figure 2C:
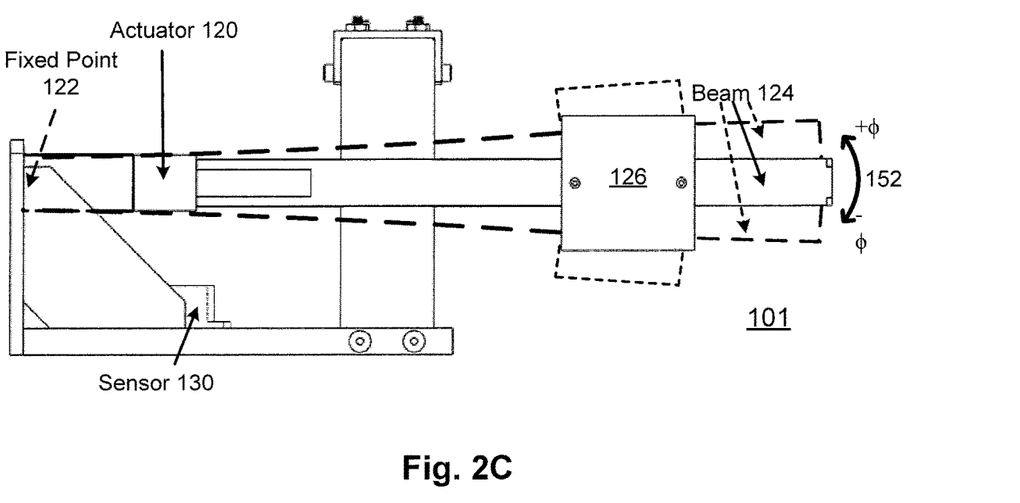
FIG. 2C illustrates a side view of an adaptive tuned vibration absorber, in one embodiment.

FIG. 2B and FIG. 2C each illustrates a side view of an adaptive tuned vibration absorber, arranged in accordance with at least some embodiments presented herein. FIGS. 2B and 2C may include components that are labeled identically to components of FIGS. 1-2, which will not be described again for the purposes of clarity. The description of FIGS. 2B and 2C may reference at least some of the components of FIGS. 1-2.

In examples shown in FIG. 2B and FIG. 2C, beam 124 may be a cantilever beam with a fixed end of beam 124 attached to tuned vibration absorber 101 at fixed point 122, such that beam 124 oscillates about fixed point 122. In the example shown in FIG. 2B, springs 201, 202 may extend or compress to restrict the oscillation of the cantilever beam (e.g., beam 124), such that beam 124 may not rotate or oscillate outside of the range of threshold angle [−ϕ:ϕ]. In the example shown in FIG. 2C, tuned vibration absorber 101 may include a cantilever beam (e.g., beam 124) but may exclude springs 201, 202. When tuned vibration absorber 101 excludes springs 201, 202, the oscillation of the cantilever beam (e.g., beam 124) may be restricted by the rigid support provided by the attachment of the fixed end of beam 124 to tuned vibration absorber 101 at fixed point 122.

Figure 3:
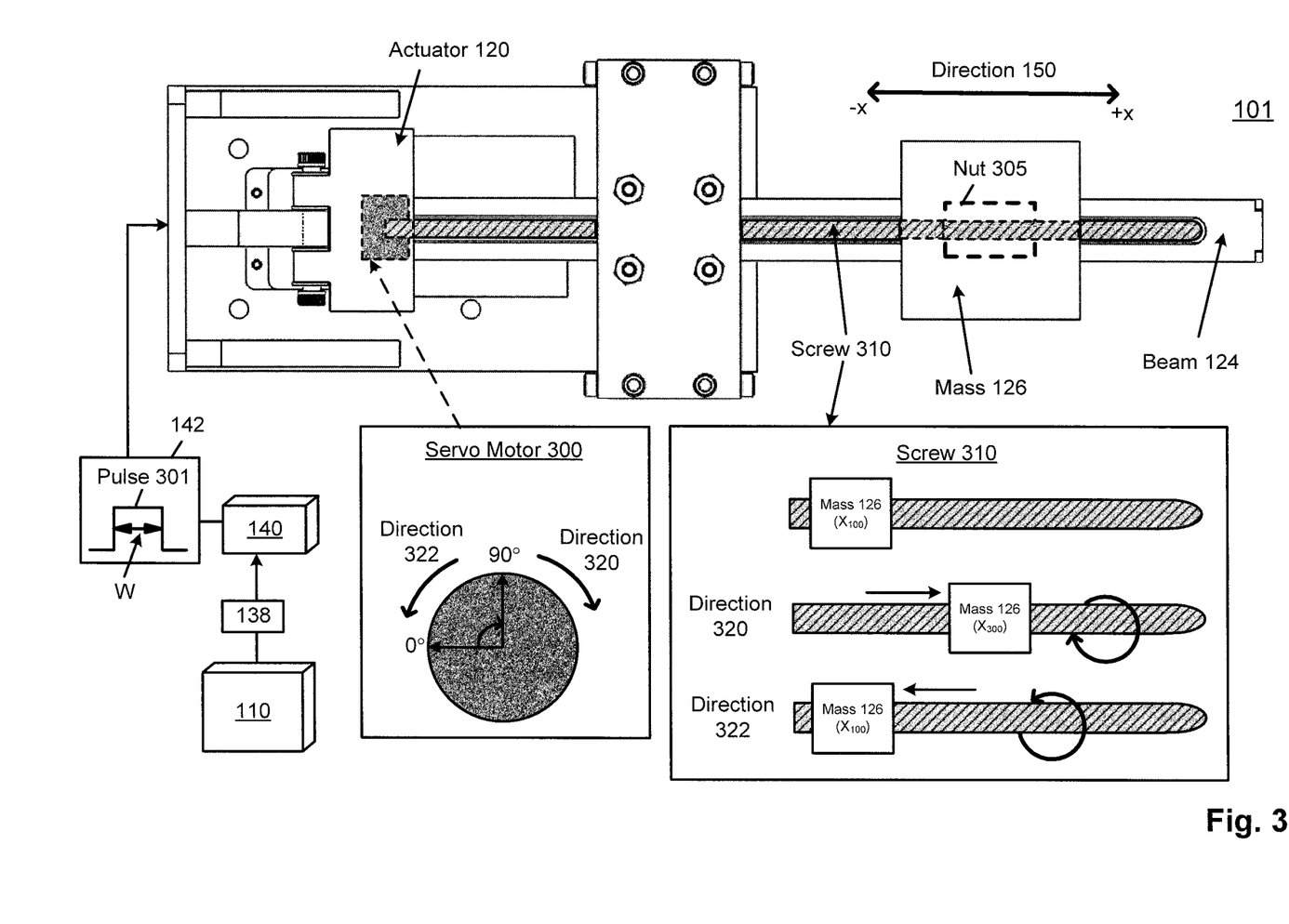
FIG. 3 illustrates a top view of an adaptive tuned vibration absorber, in one embodiment.

FIG. 3 illustrates a top view of an adaptive tuned vibration absorber, arranged in accordance with at least some embodiments presented herein. FIG. 3 may include components that are labeled identically to components of FIGS. 1-2C, which will not be described again for the purposes of clarity. The description of FIG. 3 may reference at least some of the components of FIGS. 1-2C.

In an example shown in FIG. 3, actuator 120 may be a rotary or a linear actuator including a servo motor 300, a nut 305, and a screw 310, where mass 126 may be attached to nut 305, and screw 310 may be attached to servo motor 300. As servo motor 300 rotates, screw 310 may also rotate in the same direction due to screw 310 being attached to servo motor 300. Thus, servo motor 300 may be an electric motor configured to rotate screw 310, where screw 310 may be a mechanism that converts rotational motion to linear motion. The linear motion converted by screw 310 may cause nut 305 to move along direction 150. Thus, by attaching mass 126 on nut 305, mass 126 may move along direction 150 on beam 124 in accordance with the rotation of servo motor 300 and screw 310. In another example, actuator 120 may be a traveling-nut linear actuator that includes a stepper motor configured to move mass 126 along beam 124 in direction 150.

An amount of movement of mass 126 on bean 124 may be based on an amount of rotation of servo motor 300, and a direction (+x or −x) of the movement of mass 126 may be based on a direction of the rotation of servo motor 300. Motor controller 140 may be configured to input drive signal 142, that may include a train of input pulses, such as a pulse 301, into actuator 120. The amount of rotation of servo motor 300 may be based on a pulse width of the pulses among drive signal 142. For example, servo motor 300 may receive pulse 301 with a pulse width W, which may cause servo motor to rotate from 0-degree (0°) to 90-degrees (90°) in direction 320.

Control data 138 generated by processor 110 may indicate a value of pulse width W and a rotation direction to rotate servo motor 300. Motor controller 140 may generate drive signal 142 based on the pulse width and the rotation direction indicated by control data 138. In an example, mass 126 needs to be adjusted from default position $X_H$ (which in this example, is $X_{100}$) to position $X_{300}$. Processor 110 may generate control data 138 that indicates a value of pulse width W that would rotate servo motor 300 in a rotation direction 320 ("direction 320") by a particular amount (e.g., number of degrees, a percentage such as 25% of 360-degrees being 90-degrees, etc.). Motor controller 140 may generate drive signal 142 according to the pulse width and direction indicated by control data 138, and may input drive signal 142 to servo motor 300. As servo motor 300 rotates in direction 320, screw 310 may also rotate in direction 320 and may cause mass 126 to move along +x direction. In another example, mass 126 needs to be adjusted from default position $X_{300}$ back to default position $X_{100}$. Processor 110 may generate control data 138 that indicates a value of pulse width W that would rotate servo motor 300 in a rotation direction 322 ("direction 322") by a particular amount. As servo motor 300 rotates in direction 322, screw 310 may also rotate in direction 322 and may cause mass 126 to move along −x direction.

Figure 4:
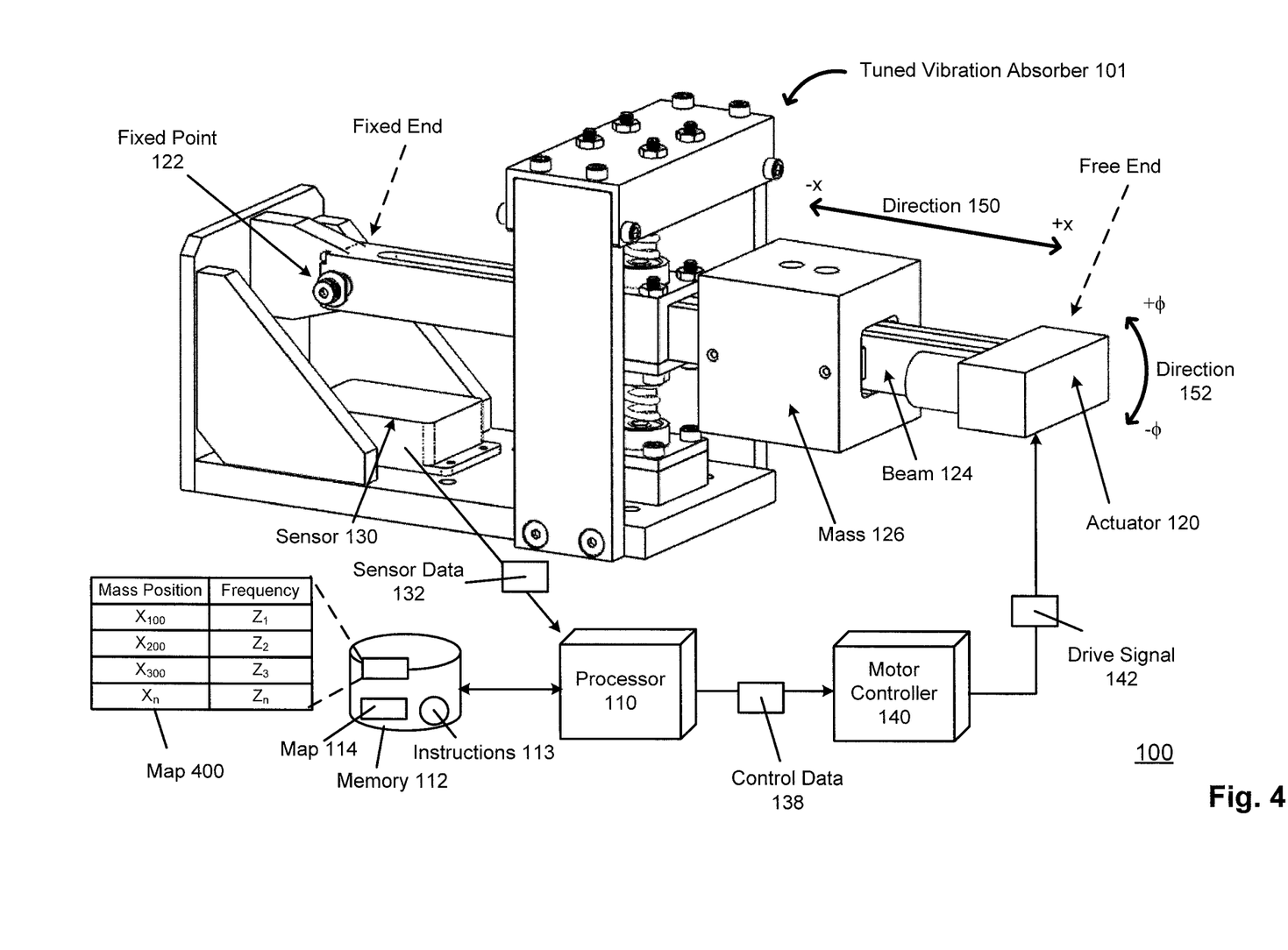
FIG. 4 illustrates a perspective view of an adaptive tuned vibration absorber, in one embodiment.

FIG. 4 illustrates an adaptive tuned vibration absorber, arranged in accordance with at least some embodiments presented herein. FIG. 4 may include components that are labeled identically to components of FIGS. 1-3, which will not be described again for the purposes of clarity. The description of FIG. 4 may reference at least some of the components of FIGS. 1-3.

In an example embodiment of tuned vibration absorber 101, actuator 120 may be disposed at a free end of beam 124, instead of a fixed end of beam 124. Disposal of actuator 120 on the free end of beam 124 may add additional weight towards the free end of beam 124, which may result in a total dynamic mass (e.g., mass of components that will be in motion upon detection of a vibration) being equal to a sum of a mass of mass 126 and a mass of actuator 120. Thus, in the example shown in FIG. 4, a reduction of the mass of mass 126 while actuator 120 is disposed at the free end of beam 124 may maintain the same performance, and may result in a relatively more effective use of the total mass of the tuned vibration absorber 101. This may alter the relationships between the position of mass 126 on beam 124 and the frequencies of the vibrations being experienced by tuned vibration absorber 101. Thus, memory 112 may be further configured to store a map 400 that may be different from map 114. For example, position $X_{100}$ of mass 126 is mapped to frequency $Y_1$ in map 114, but is mapped to frequency $Z_1$ in map 600. Further, due to the location of actuator being at the free end of beam 124 instead of the fixed end of beam 124, the indices of the positions of mass 126 may be different from the indices of the positions on mass 126 on beam 124 when actuator 120 is located at the fixed end. For example, the position $X_{100}$ when actuator 120 is located at the fixed end may be equivalent to the position $X_{600}$ when actuator 120 is located at the free end. Processor 110 may be configured to identify positions of mass 126 that may attenuate different vibrations being experienced by tuned vibration absorber 101 using map 400, similar to the usage of map 114 described above with respect to FIG. 1.

Figure 5A:
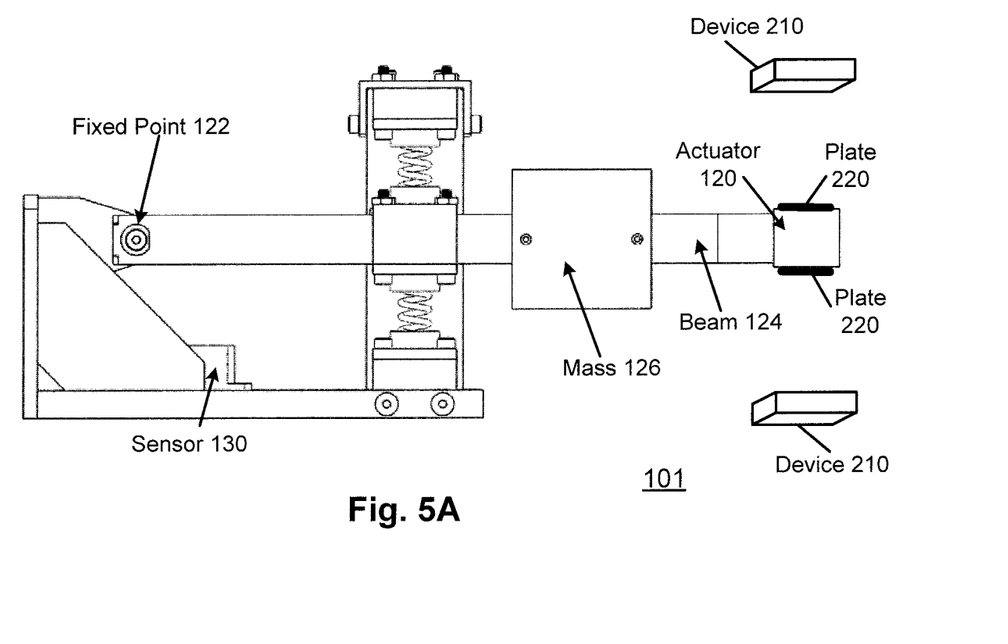
FIG. 5A illustrates a side view of the adaptive tuned vibration absorber of FIG. 4, in one embodiment.

FIG. 5A illustrates a side view of the adaptive tuned vibration absorber of FIG. 4, arranged in accordance with at least some embodiments presented herein. FIG. 5A may include components that are labeled identically to components of FIGS. 1-4, which will not be described again for the purposes of clarity. The description of FIG. 5A may reference at least some of the components of FIGS. 1-4.

As shown in FIG. 5A, actuator 120 may be disposed at a free end of beam 124. As beam 124 oscillates in direction 152, actuator 120 may also oscillate with beam 124. Further, damping devices 210 may be located at locations in which actuator 120 may not contact devices 210. In examples where devices 210 are permanent magnets, plates 220 may be disposed on surfaces of actuator 210 such that the permanent magnets may induce magnetic fields on plates 220 to restrict the oscillation of beam 124 and actuator to prevent the oscillation being out of range.

Figure 5B:
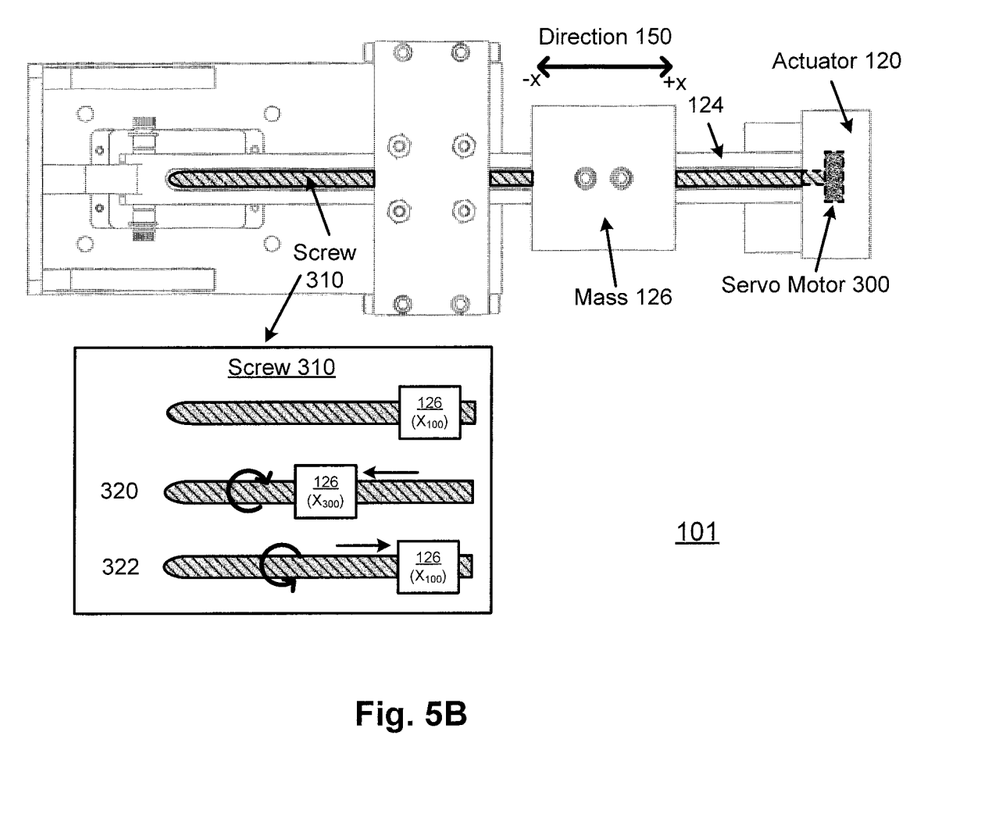
FIG. 5B a top view of the adaptive tuned vibration absorber of FIG. 4, in one embodiment.

FIG. 5B illustrates a top view of the adaptive tuned vibration absorber of FIG. 4, arranged in accordance with at least some embodiments presented herein. FIG. 5B may include components that are labeled identically to components of FIGS. 1-5A, which will not be described again for the purposes of clarity. The description of FIG. 5B may reference at least some of the components of FIGS. 1-5A.

As shown in FIG. 5B, due to actuator 120 being disposed at the free end of beam 124, rotating servo motor 300 in direction 320 may move mass 126 towards the −x direction, and rotating servo motor 300 in direction 322 may move mass 126 towards the x direction.

Figure 6:
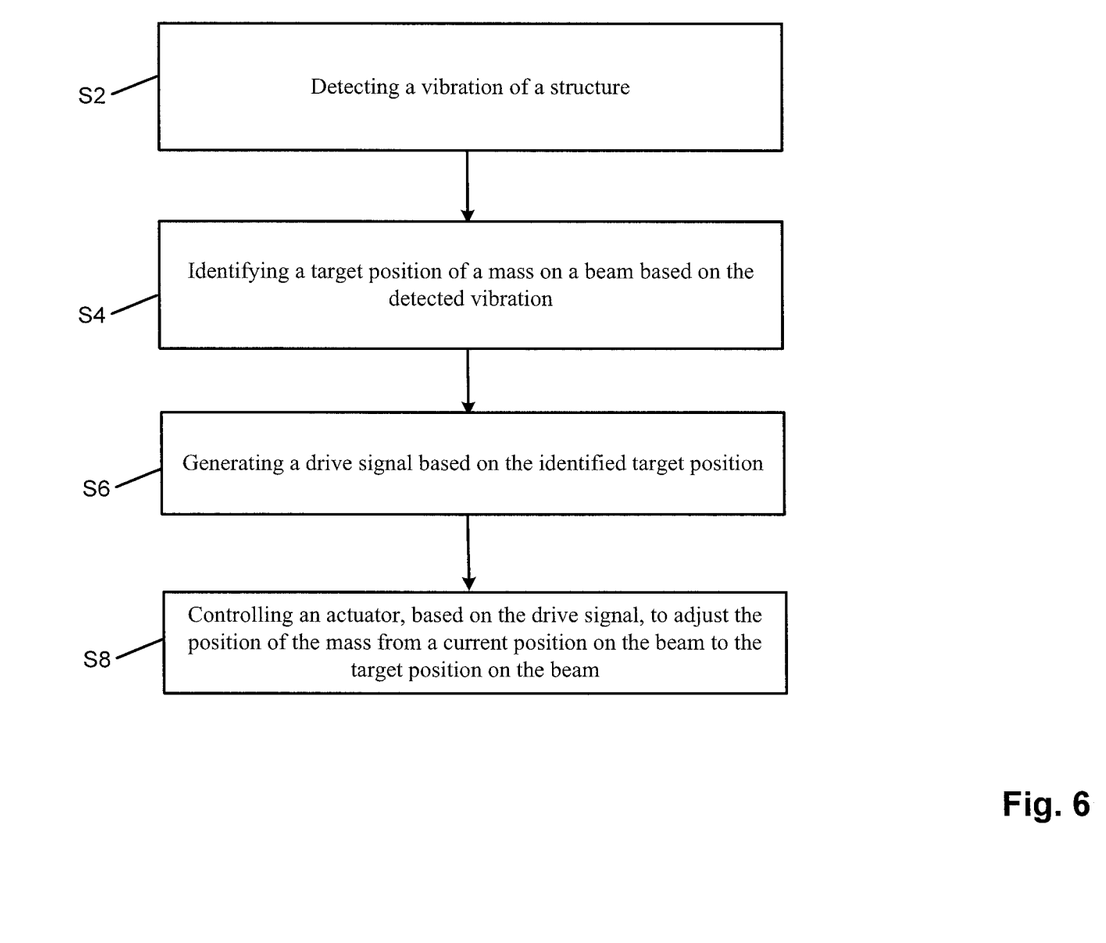
FIG. 6 illustrates a flow diagram relating to a process to implement an adaptive tuned vibration absorber, in one embodiment.

FIG. 6 illustrates a flow diagram relating to a process to implement an adaptive tuned vibration absorber, arranged in accordance with at least some embodiments presented herein. The process in FIG. 6 may be implemented using, for example, system 100 discussed above. An example process may include one or more operations, actions, or functions as illustrated by one or more of blocks S2, S4, S6, and/or S8. Although illustrated as discrete blocks, various blocks may be divided into additional blocks, combined into fewer blocks, eliminated, or performed in parallel, depending on the desired implementation.

The processing may begin at block S2, "Detecting the vibration of a structure". A block S2, a sensor of a tuned vibration absorber may detect a vibration of a structure when a mass is located at a current position on a beam.

The processing continues from block S2 to block S4, "Identifying a target position of the mass on the beam based on the detected vibration". At block S4, a processor may identify a target position of the mass on the beam based on the detected vibration. For example, the processor may identify a mapping between the target position of the mass on the beam and a frequency of the vibration, where the mapping may be stored in a memory. In some examples, the mapping is among a set of mappings between one or more different positions of the mass on the beam and one or more frequencies.

The processing may continue from block S4 to block S6, "Generating a drive signal based on the identified target position". At block S6, a motor controller may generate a drive signal that may be effective to control an actuator to adjust the position of the mass on the beam. In some examples, controlling the actuator may include controlling a motor to rotate a screw in the beam.

The processing may continue from block S6 to block S8, "Controlling the actuator, based on the drive signal, to adjust the position of the mass from a current position on the beam to the target position on the beam". At block S8, the motor controller may control the actuator, based on the drive signal, to adjust the position of the mass from the current position on the beam to the target position on the beam. The mass being disposed at the target position on the beam may attenuate the vibration being experienced by the tuned vibration absorber. In some examples, the actuator may adjust the position of the mass to a default position on the beam upon attenuating the vibration.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for attenuating vibration, the method comprising:
   detecting a vibration of a structure, wherein the vibration causes a free end of a beam to oscillate about a fixed end of the beam;
   identifying a target position among a plurality of positions in a map stored in a memory, wherein the plurality of positions are positions on the beam, the map comprises mappings between the plurality of positions to a plurality of frequencies, the identified target position is mapped to a frequency of the detected vibration, and wherein a particular position being mapped to a particular frequency indicates that a mass being positioned at the particular position successfully attenuated one or more vibrations having the particular frequency at one or more historical instances;
   generating a drive signal based on the identified target position, wherein the drive signal is effective to control an actuator to adjust the position of the mass on the beam from a current position of the mass on the beam to the target position, the drive signal is generated based on the current position of the mass on the beam, and the current position of the mass is stored in the memory; and
   controlling the actuator, based on the drive signal, to adjust the position of the mass from the current position on the beam to the target position on the beam to alter the oscillation of the free end of the beam in order to attenuate the vibration of the structure.

2. The method of claim 1, wherein the drive signal includes at least one pulse, a pulse width of the at least one pulse indicates a direction and a distance to move the mass on the beam, and the method further comprising controlling a motor of the actuator to drive the mass along the beam from the current position on the beam to the target position in accordance to the direction and the distance indicated by the pulse width.

3. The method of claim 1, further comprising adjusting the position of the mass to a predefined default position in response to detecting one of:
   an amplitude of the vibration of the structure being outside of a range of threshold amplitudes; and
   a frequency of the vibration of the structure being outside of a defined frequency range.

4. The method of claim 1, further comprising:
   identifying an absence of a defined mapping between a position of the mass on the beam and the frequency of the detected vibration; and
   in response to the identification of the absence of the defined mapping, controlling the actuator to drive the mass from the current position along the beam to identify a desired position of the mass on the beam.

5. The method of claim 1, wherein the beam is a cantilever beam.

6. The method of claim 1, wherein the actuator is a traveling-nut linear actuator comprising a nut and a screw, the nut is attached to the mass, and the screw is inside the beam.

7. The method of claim 1, wherein the oscillation of the free end of the beam causes the free end of the beam to rotate about the fixed end of the beam in a rotational angle, such that a motion of the mass on the beam caused by the oscillation is non-parallel to a longitudinal direction of the beam.

8. A tuned vibration absorber comprising:
   a beam, wherein a fixed end of the beam is attached to a fixed point of the tuned vibration absorber, such that the beam is operable to oscillate about the fixed point;
   a mass disposed on the beam;
   an actuator configured to adjust a position of the mass on the beam;
   a motor controller configured to control the actuator;
   a sensor configured to:
      detect a vibration of a structure, wherein the vibration causes a free end of the beam to oscillate about the fixed end of the beam;
      generate sensor data associated with the vibration;
      send the sensor data to a processor; and
   the motor controller is configured to:
      receive control data from the processor, wherein the control data is based on the sensor data and based on a current position of the mass on the beam, the current position of the mass being stored in a memory, and the control data indicates a target position mapped to a frequency of the detected vibration in a map stored in the memory, the target position is among a plurality of positions of the beam in the map, wherein the map comprises mappings between the plurality of positions to a plurality of frequencies, and wherein a particular position being mapped to a particular frequency indicates that a mass being positioned at the particular position successfully attenuated one or more vibrations having the particular frequency at one or more historical instances;
      generate a drive signal based on the received control data, wherein the drive signal is effective to control the actuator to adjust the position of the mass on the beam from the current position of the mass on the beam to the target position; and control the actuator, based on the drive signal, to adjust the position of the mass from the current position on the beam to the target position on the beam, wherein the mass being located at the target position on the beam is effective to alter the oscillation of the free end of the beam in order to attenuate the vibration of the structure.

9. The tuned vibration absorber of claim 8, wherein the drive signal includes at least one pulse, a pulse width of the at least one pulse indicates a direction and a distance to move the mass on the beam, and the motor controller is further configured to control a motor of the actuator to drive the mass along the beam from the current position on the beam to the target position in accordance to the direction and the distance indicated by the pulse width.

10. The tuned vibration absorber of claim 8, wherein the beam is a cantilever beam.

11. The tuned vibration absorber of claim 8, wherein the actuator is disposed at the free end of the beam.

12. The tuned vibration absorber of claim 8, wherein the actuator is disposed at the fixed end of the beam.

13. The tuned vibration absorber of claim 8, further comprising one or more damping components configured to restrict the oscillation of the beam within a range of rotation angles, the one or more damping components being disposed at locations that prevent the one or more damping components from contacting the beam.

14. The tuned vibration absorber of claim 8, wherein the fixed point is a pivot, such that the beam is operable to rotate about the pivot.

15. The tuned vibration absorber of claim 8, further comprising a first spring and a second spring attached to the beam, the first spring and the second springs extend and compress in a linear direction orthogonal to the longitudinal direction of the beam, the extension and compression of the first spring and the second spring restrict the oscillation of the beam such that the beam does not oscillate outside of a threshold angle.

16. A system effective to attenuate vibrations, the system comprises:
    a tuned vibration absorber comprising:
        a beam, wherein a fixed end of the beam is attached to a fixed point of the tuned vibration absorber, such that the beam is operable to oscillate about the fixed point;
        a mass disposed on the beam;
        an actuator configured to adjust a position of the mass on the beam;
        a motor controller configured to control the actuator;
    a sensor configured to detect a vibration of a structure, wherein the vibration causes a free end of the beam to oscillate about the fixed end of the beam;
    a memory;
    a processor configured to be in communication with the tuned vibration absorber and the memory;
    the sensor is further configured to:
        generate sensor data associated with the vibration;
        send the sensor data to the processor;
    the processor is configured to:
        identify a target position among a plurality of positions in a map stored in the memory, wherein the plurality of positions are positions on the beam, the map comprises mappings between the plurality of positions to a plurality of frequencies, the identified target position is mapped to a frequency of the detected vibration, and wherein a particular position being mapped to a particular frequency indicates that the mass being positioned at the particular position successfully attenuated one or more vibrations having the particular frequency at one or more historical instances;
        generate control data that indicates the identified target position, wherein the control data is generated based on a current position of the mass on the beam, and the current position of the mass is stored in the memory;
        send the control data to the motor controller;
    the motor controller is configured to:
        receive the control data from the processor;
        generate a drive signal based on the received control data, wherein the drive signal is effective to control the actuator to adjust the position of the mass on the beam from the current position of the mass on the beam to the target position; and
        control the actuator, based on the drive signal, to adjust the position of the mass from the current position on the beam to the target position on the beam, wherein the mass being located at the target position on the beam is effective to alter the oscillation of the free end of the beam in order to attenuate the vibration of the structure.

17. The system of claim 16, wherein the motor controller is further configured to control the actuator to adjust the position of the mass to a default position in response to detecting one of:
    an amplitude of the vibration of the structure being outside a range of threshold amplitudes; and
    a frequency of the vibration of the structure being outside of a defined frequency range.

18. The system of claim 16, further comprises one or more damping components configured to restrict the oscillation of the beam caused by the vibration within a range of rotation angles, the one or more damping components being disposed at locations that prevent the one or more damping components from contacting the beam.

19. The tuned vibration absorber of claim 16, wherein the actuator is disposed at the free end of the beam.

20. The tuned vibration absorber of claim 16, wherein the actuator is disposed at the fixed end of the beam.

* * * * *